United States Patent
Ann (10) Patent No.: US 7,877,018 B2
(45) Date of Patent: Jan. 25, 2011

(54) METHOD AND APPARATUS FOR CORRECTING COLOR IMBALANCE OF VISIBLE LIGHT IN WAVELENGTH DIVISION PARALLEL VISIBLE LIGHT COMMUNICATIONS

(75) Inventor: Jong-Hoon Ann, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 673 days.

(21) Appl. No.: 11/893,194

(22) Filed: Aug. 15, 2007

(65) Prior Publication Data
US 2008/0181617 A1    Jul. 31, 2008

(30) Foreign Application Priority Data
Jan. 29, 2007    (KR) .................. 10-2007-0008854

(51) Int. Cl.
*H04B 10/00* (2006.01)
(52) U.S. Cl. ........................................ 398/172
(58) Field of Classification Search .......... 398/172
See application file for complete search history.

(56) References Cited
U.S. PATENT DOCUMENTS
2002/0005973 A1* 1/2002 Pfeiffer .................. 359/173

2008/0063410 A1* 3/2008 Irie ........................ 398/182

FOREIGN PATENT DOCUMENTS

| JP | 2000-004238 | 1/2000 |
|---|---|---|
| JP | 2005-260380 | 9/2005 |
| KR | 2006-34883 | 4/2006 |

* cited by examiner

*Primary Examiner*—Leslie Pascal
(74) *Attorney, Agent, or Firm*—Cha & Reiter, LLC (57) ABSTRACT

Disclosed is a method and an apparatus for correcting a color imbalance of visible light in wavelength division parallel visible light communications. The method includes the steps of: inverting an original signal including information by a visible light communication transmitter; transmitting the original signal including the information and an inverted signal from the visible light communication transmitter to a visible light communication receiver, receiving the original signal including the information and the inverted signal by the visible light communication receiver, reinverting the inverted signal among the received signals by the visible light communication receiver, restoring the inverted signal back to its state prior to the inversion by reinverting the inverted signal by the visible light communication receiver, and performing a diversity combination on the original signal and a restored signal.

19 Claims, 6 Drawing Sheets

METHOD AND APPARATUS FOR CORRECTING COLOR IMBALANCE OF VISIBLE LIGHT IN WAVELENGTH DIVISION PARALLEL VISIBLE LIGHT COMMUNICATIONS

CLAIM OF PRIORITY

This application claims the benefit of the earlier filing date, under 35 U.S.C. §119(a), to that patent application entitled "Method and Apparatus for Correcting Color Imbalance of Visible Light in Wavelength Division Parallel Visible Light Communications," filed in the Korean Industrial Property Office on Jan. 29, 2007 and assigned Serial No. 2007-8854, the contents of which are hereby incorporated by reference.

BACKGROUND OF THE INVENTION

1. Field of the Invention

The present invention relates to wavelength division communications, and more particularly to a method and an apparatus for generating a visible light signal which corrects the energy differences among wavelengths when parallel transmission is implemented by using the multiple wavelengths in a visible light communication system.

2. Description of the Related Art

Recently, as Light Emitting Diodes (LEDs) have been improved in luminous efficiency, LEDs are more commonly used not only in a special illumination market, such as handheld devices, displays, automobiles, traffic lights, advertising boards, etc., but also in a general illumination market, such as fluorescent lamps, incandescent electric lamps, etc. Also, as interest in optical wireless technology complementary with RF technology has increased because of a number of different reasons (e.g., exhaustion of the frequencies in a Radio Frequency (RF) band, possibility of interference of RF communication among wireless communications, an increase of the security requirement for communications, the advent of a very high-speed ubiquitous communication environment of fourth generation mobile communication (4G) wireless technology, etc.,) studies are being carried out on optical wireless communications using visible light LEDs in many enterprises and research institutes, etc.

The visible light communications for transmitting information by using visible light have merit, such as a wide use band and the ability to be freely used without being subject to regulation. Also, the visible light communications have merit in that the reception range of information can be accurately sensed because a spot where light reaches or a direction in which the light moves can be seen. Accordingly, the visible light communications have a reliability in an aspect of security, and also have merit such as the ability to be driven with low electric power in another aspect of power consumption.

Luminous elements for the visible light communications have made rapid progress lately, but are not yet able to turn on/off at high speed. To cite an example, in a case of a white LED using phosphor, its manufacturing cost is cheap but its modulation speed is no more than about 10 Mega-bits per second (Mbps). In order to overcome this limitation, studies are proceeding on a scheme in which visible light having information is generated by using multiple LEDs for generating three primary colors, including Red, Green, and Blue (RGB), and the generated colored lights are mixed to make white light. A scheme of transmitting signals in parallel by using the multiple LEDs for generating the three primary colors has merit in that high-speed transmission can be implemented, but in a case where the balance among respective energy distributions of wavelengths are upset, there appears a problem such that generated light can have a color tone other than white. If the generated light corresponds to light having any color tone other than the white light, this becomes a serious disadvantage in the visible light communications in which a transmitter serves as a lighting device. A description will be made of a conventional apparatus for wavelength division parallel visible light communications, which transmits signals in parallel by using the multiple LEDs.

Figure 1:
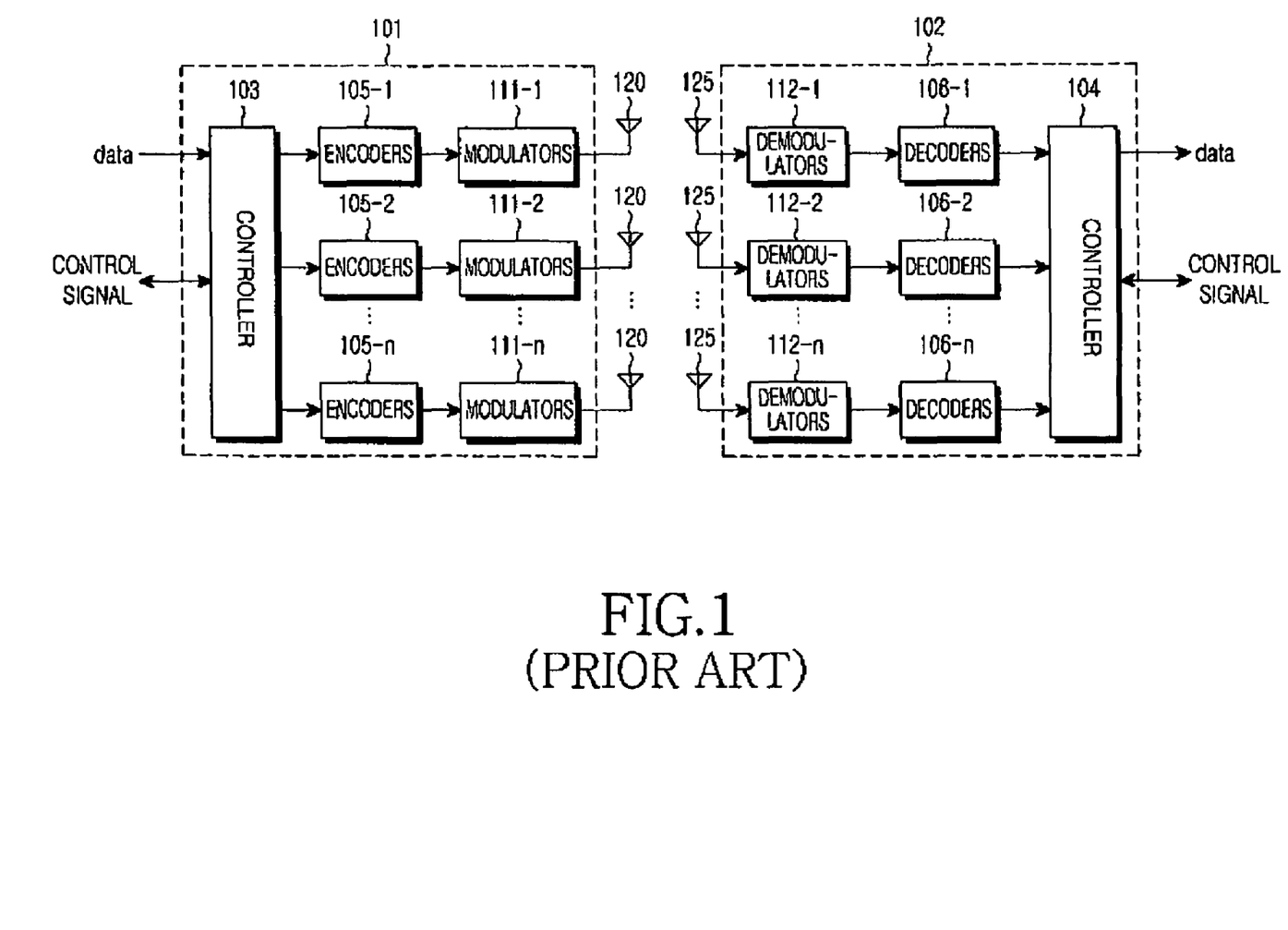
FIG. 1 is a block configuration diagram illustrating an example of a general transceiver for wavelength division parallel visible light communications.

FIG. 1 is a block configuration diagram illustrating an example of a conventional transceiver for wavelength division parallel visible light communications. With reference to FIG. 1, a transmitter 101 for visible light communications includes multiple encoders 105-1 thru 105-$n$, multiple modulators 111-1 thru 111-$n$, a light generator 120, and a controller 103. Herein, the multiple encoders 105 are configured in parallel, and perform channel coding on data to be transmitted. The multiple modulators 111 are configured in parallel, and modulate respective channel-coded data from the multiple encoders 105. The light generator 120 transmits signals modulated by the multiple modulators 111 as visible signals. The controller 103 controls each configuration element of the transmitter 101 for visible light communications.

A receiver 102 for visible light communications includes a light sensor 125 multiple demodulators 112-1 thru 112-$n$, multiple decoders 106-1 thru 106-$n$, and a controller 104. Herein, the light sensor 125 receives visible light signals. The multiple demodulators 112 are configured in order to demodulate the visible light signals received by the light sensor. The multiple decoders 106 receive respective signals demodulated by the multiple demodulators 112, perform channel decoding on the respective received signals in order to restore the respective received signals to their original states. The controller 104 controls configuration elements of the receiver 102 for visible light communications. In the apparatus for wavelength division parallel visible light communications, paths independently operate by each path wherein path information is to be transmitted has been determined.

Figure 2:
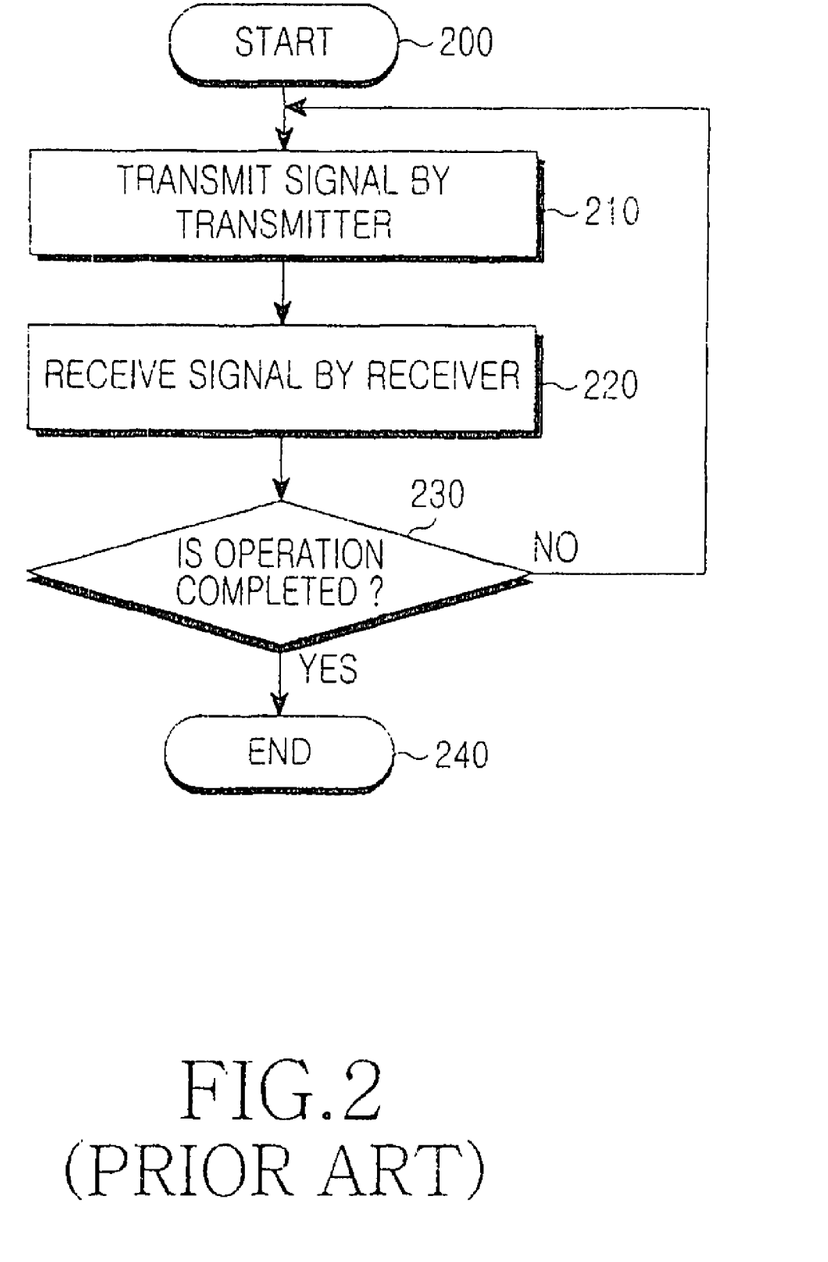
FIG. 2 is a flowchart illustrating Tx/Rx operations in general wavelength division parallel visible light communications.

FIG. 2 is a flowchart illustrating transmission/receive (Tx/Rx) operations of wavelength division parallel visible light communications in general. Referring to FIG. 2, the transceiver for visible light communications begins to operate. In step 210, the transmitter for visible light communications transmits a visible light signal, and in step 220, the receiver for visible light receives the visible light signal from the transmitter for visible light communications. Thereafter, in step 230, it is determined whether the Tx/Rx operations are completed. If it is determined that the Tx/Rx operations are completed, in step 240, the Tx/Rx operations of visible light communications are completed. If not, the procedure returns back to step 210, and the Tx/Rx operations are repeatedly performed until the Tx/Rx operations are completed.

In the meantime, a color balance refers to a state where final mixing light has white color as energy distributions in the specific ratio are achieved by each of the wavelengths of Red, Green, Blue visible lights. A mixture of light is determined according to the energy ratio among the three primary colors. Namely, the energy distribution rate according to wavelength of light determines a color tone of the light. Specially, the white light has electric power existing over all wavelength bands. The relation between energy by wavelengths and a color tone of the light can be found with reference to a chromaticity diagram.

Since parallel transmission can be achieved if different information is transmitted by each wavelength, high-speed luminous elements are not required. The receiver filters a received light signal through an optical filter, and can extract and recover only a signal having a desired wavelength. Because different information is transmitted by each wavelength if the scheme of parallel transmission using the wavelength division is viewed from the aspect of color balance, an energy balance may not be kept among multiple wavelengths, and light generated from the loss of the energy balance cannot be white light. If the generated light corresponds to light other than white light, this becomes a serious problem in the visible light communications in which the transmitter serves as the lighting device at the same time.

Also, because the visible light communications using wavelength division correspond to a system in which free space propagation is performed, the visible light communications are affected by a phenomenon where wireless channels are time-varying. This phenomenon implies that the communications are implemented in an environment different from a communication system using optical fibers. There is diversity technique among techniques for coping with a time-varying channel in a general Radio Frequency (RF) communication system. The diversity refers to technique for retransmitting data to be transmitted over several times by allocating other channel resources (e.g., time, frequency, codes, space) to the data to be transmitted so as to guarantee more accurate transmission/receive in a communication system.

Furthermore, an iterative encoding technique is one of the techniques used for providing a stable transmission. The iterative encoding technique corresponds to the simplest channel encoding technique, and refers to a method for repeating transmission of the same signal on the assumption that a transceiver has already perceived a pattern.

However, in a case where the prior diversity technique and the iterative encoding technique are applied to a visible light communication system, as the imbalance of electric power among wavelengths causes a difference of electric power among the wavelengths to become larger, the more difficult the generation of white light becomes.

SUMMARY OF THE INVENTION

Accordingly, the present invention has been made to solve the above problems occurring in the prior art, and it is an aspect of the present invention to provide a method for generating a visible light signal that corrects energy differences among wavelengths when parallel transmission is implemented by using the multiple wavelengths different from one another in a visible light communication system.

In accordance with one aspect of the present invention there is provided a method for correcting a color imbalance of visible light in wavelength division parallel light communications according to an embodiment of the present invention, including the steps of inverting an original signal including information by a light communication transmitter, transmitting the original signal including the information and an inverted signal together from the visible light communication transmitter, receiving the original signal including the information and the inverted signal by the visible light communication receiver, reinverting the inverted signal among the received signals by the visible light communication receiver, restoring the inverted signal back to its state prior to the inversion by reinverting the inverted signal by the visible light communication receiver, and performing a diversity combination on the original signal and a restored signal.

In accordance with another aspect of the present invention, there is provided an apparatus for correcting a color imbalance of visible light in wavelength division parallel light communications including a visible light communication transmitter, including: multiple encoders having a parallel configuration for performing channel coding on data to be transmitted, multiple modulators having a parallel configuration for modulating data on which the multiple encoders have performed the channel coding, an inverter for inverting a signal provided by the multiple modulators, a switch for connecting in turn an original signal provided by the multiple modulators and an inverted signal from the inverter with a light generator according to a switching control signal, the light generator for transmitting a visible light signal and a controller for controlling configuration elements of visible light communication transmitter during a transmission operation, and for outputting the switching control signal by dividing a signal into the original signal and the inverted signal, and a visible light communication receiver, including a light sensor for receiving the visible light signal, a switch for connecting the original signal to a first path if the visible light signal received by the light sensor corresponds to the original signal and connecting the inverted signal to a second path if the received visible light signal corresponds to the inverted signal, according to a switching control signal, an inverter for restoring the received inverted signal back to its state prior to the inversion by reinverting the inverted signal on receiving the inverted signal through the second path from the switch, a gain adjuster for inputting the original signal going through the first path connected by the switch and a restored signal going through the second path which forward flow starts from the switch and passes through the inverter, for adding gain of the original signal and gain of the restored signal by adjusting the gains of the two signals, multiple demodulators having a parallel configuration for all demodulating a signal added by the gain adjuster, multiple decoders having a parallel configuration for receiving respective data demodulated by the multiple demodulators, and for performing channel decoding on the respective received data thereof, and a controller for controlling configuration elements of the visible light communication receiver during a receive operation, and for outputting the switching control signal by determining if the received signal corresponds to the original signal or the inverted signal.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE INVENTION

Exemplary embodiments of the present invention will be described with reference to the accompanying drawings. The particulars such as specific configuration elements, etc., are described in the following description, and are only provided in order to provide comprehensive understanding of the present invention. It will be obvious to those skilled in the art that predetermined changes in form or prescribed modifications may be made in these particulars are within the spirit and scope of the invention. Also, in describing the present invention, a detailed description in regard of the art known to the public related to the present invention will be omitted in a case where it is determined that the detailed description may unnecessarily make the subject matter of the present invention unclear.

Figure 3:
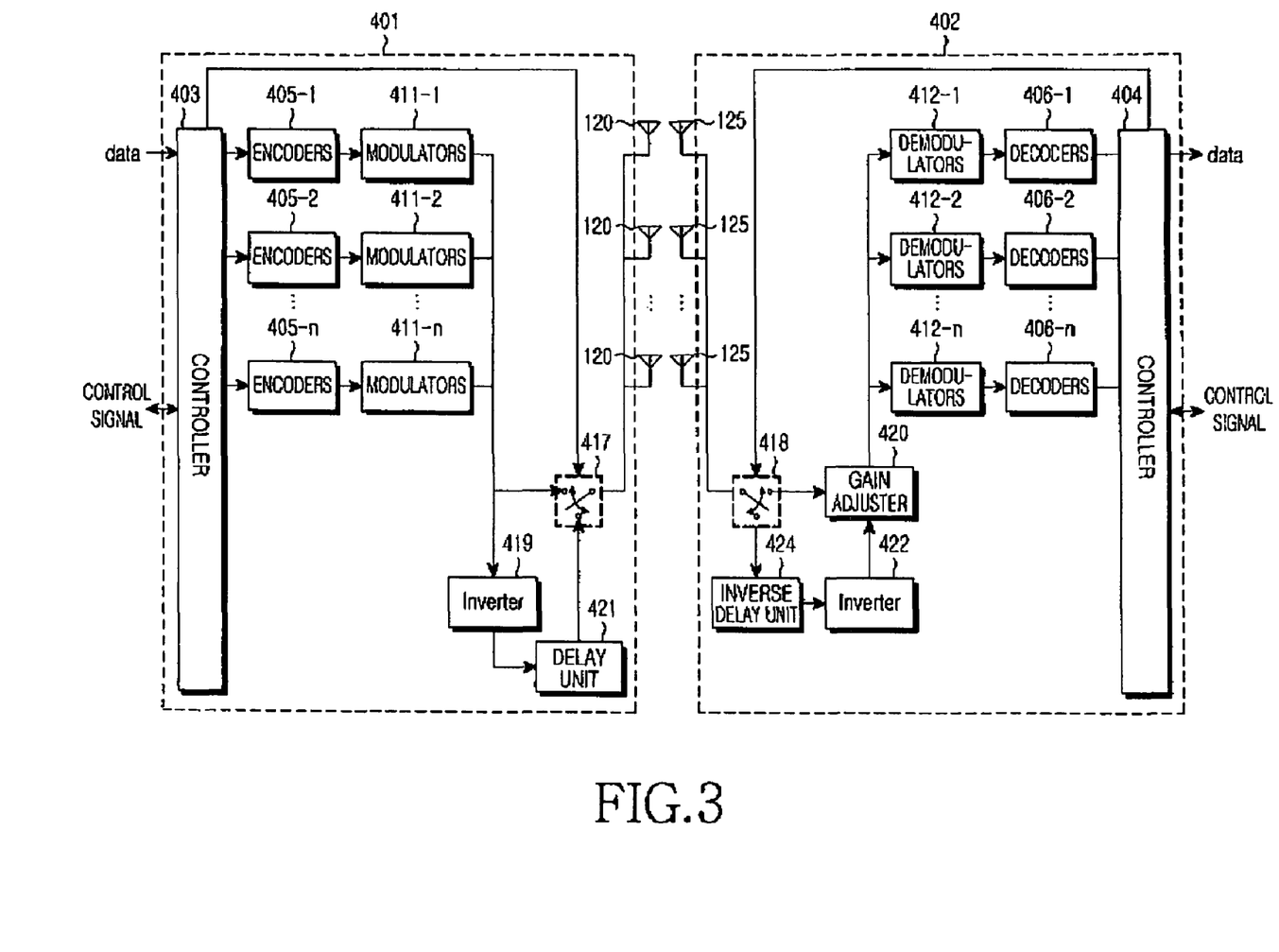
FIG. 3 is a block configuration diagram illustrating a transceiver for wavelength division parallel visible light communications according to an embodiment of the present invention.

FIG. 3 is a block configuration diagram illustrating a transceiver for wavelength division parallel visible light communications according to an embodiment of the present invention. With reference to FIG. 3, a transmitter 401 for wavelength division parallel visible light communications includes multiple encoders 405-1 thru 405-n, multiple modulators 411-1 thru 411-n, an inverter 419, a delay unit 421, a switch 417, a light generator (not shown) and a controller 403. The multiple encoders 405 have a parallel configuration, and perform channel coding on data to be transmitted. The multiple modulators 411 have a parallel configuration, and modulate respective channel-coded data from the multiple encoders 405. The inverter 419 inverts a signal value '1' (where '1' corresponds to a bit enabling a luminous element to turn on) provided by the multiple modulators 411 into a '0' value and inverts a '0' value (where '0' corresponds to a bit enabling a luminous element to turn off) into '1.' The delay unit 421 delays a signal inverted by the inverter 419 as much as one time slot.

According to a switching control signal, the switch 417 alternately connects, to the light generator 120, an original signal provided through a first path via the multiple modulators 411 and an inverted delayed signal provided through a second path (i.e., multiple modulators 411, the inverter 419, and the delay unit 421). The light generator 120 is made up of a plurality of LEDs, and transmits a visible light signal. The controller 403 controls configuration elements of the transmitter 401 during a transmission operation, and outputs the switching control signal by determining if the received signal corresponds to the original signal or the inverted signal.

A receiver 402 for wavelength division parallel visible light communications includes a light sensor 125, a switch 418, an inverse delay unit 424, an inverter 422, a gain adjuster 420, multiple demodulators 412-1 thru 412-n, multiple decoders 406-1 thru 406-n, and a controller 304. The light sensor 125 receives a visible light signal. According to a switching control signal, the switch 418 connects the original signal to the gain adjuster 420 if the visible light signal received by the light sensor corresponds to the original signal and connects the inverted and delayed signal to the inverse delay unit 424 if the received visible light signal corresponds to the inverted and delayed signal. The inverse delay unit 424 receives the inverted and delayed signal from the switch 418, and advances the inverted delayed signal by one time slot. Note that the function of inverse delay unit (424) is to match original signal and delayed, inverted signal, thus the original signal and the delayed signal should be inputted to gain adjuster (420) at the same time. The inverter 422 receives an inverted signal from the inverse delay unit 424, and restores the inverted signal by inverting the inverted signal. The gain adjuster 420 inputs the original signal provided from the switch 418 and a restored signal going through the inverse delay unit 424 and the inverter 419, and adds gain of the original signal and gain of the restored signal by adjusting the gains of the two signals. The multiple demodulators 412 have a parallel configuration, and each demodulate a signal added by the gain adjuster 420. The multiple decoders 406 having a parallel configuration receive respective data demodulated by the multiple demodulators 412, and perform channel decoding on the respective received data thereof. The controller 404 controls configuration elements of the receiver 402 during a receive operation, and outputs the switching control signal by dividing the received signal into the original signal and the inverted signal.

A description will be made of a method for correcting a color imbalance of visible light according to an embodiment of the present invention. The transmitter 401 classifies data to be transmitted by each path, and transmits classified data in parallel. Information to be transmitted proceeds through a first path or a second path, and is then transmitted to the receiver 402, where the first path refers to a path though multiple decoders 405, multiple modulators 411, switch 417 and the light generator, and the second path denotes a path through multiple decoders 405, multiple modulators 411, inverter 419, delay unit 421, switch 417, and the light generator. Namely, the form of a signal transmitted from the transmitter 401 corresponds to a scheme where a signal proceeding through the first path and a signal proceeding through the second path are alternately transmitted. Because the original signal and the delayed inverted signal, which has been generated by delaying an inverted signal as much as one time slot following an inversion of the original signal, are alternately transmitted, the mean of electric power by respective wavelengths of the signal transmitted during two time slots corresponds to half of the total electric power that can be transferred. Therefore, electric power among the wavelengths are substantially equal to one another.

Upon receiving the visible light signal, the receiver 402 enables the switch 418 to divide the received signal into one signal transmitted through the first path and a second signal transmitted through the second path according to a switching control signal. Then, the receiver 402 enables the inverse delay unit 424 and the inverter 422 to receive the other (second) signal transmitted through the second path and to restore the received signal back to its state prior to the inversion and delay. Then, the receiver 402 enables the gain adjuster 420 to adjust gain of the original signal transmitted through the first path and gain of the restored signal and to add the gains of the two signals. Thereafter, an added signal from the gain adjuster 420 goes through the multiple demodulators 412 and the multiple decoders 406, and are then restored to their former states. In the visible light communications system according to an embodiment of the present invention, the transmitter 401 can radiate white light whose color balance is kept according to a method for correcting a color tone of visible light using diversity, and the receiver 402 can acquire diversity gain by using time diversity technique—The principal of diversity is that the transmitter sends the data more than twice, and the receiver tries to catch the signal more than two times. The transmitted signal could be sent in different frequency or different time or different space. In the embodiment, a symbol or a bit are transmitted twice. A first signal is original state (on or off). A second signal is inverted state (off or on). Inversion is to compensate energy difference in each wavelength. In alternate embodiment, no inversion diversity gain may be expected.

Also, an iterative encoding technique can be applied to an embodiment of the present invention. In a case where the same signal is repeatedly transmitted from the transmitter 401 using the iterative encoding technique, Tx/Rx operations are accomplished through the above-described operation, and in this case, the gain adjuster 420 repeatedly adds the transmitted signals into a single signal.

Figure 4:
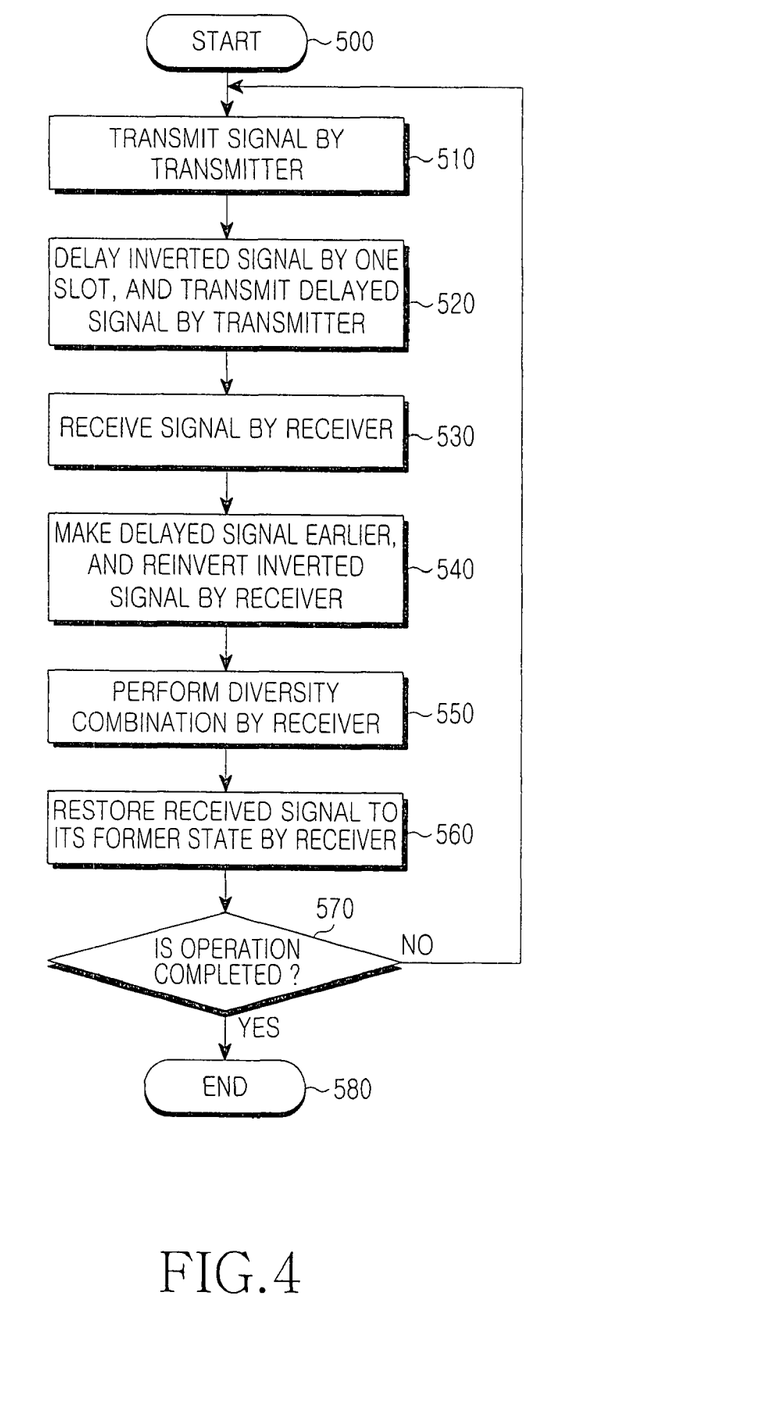
FIG. 4 is a flowchart illustrating Tx/Rx operations of a wavelength division parallel visible light communications according to an embodiment of the present invention.

FIG. 4 is a flowchart illustrating Tx/Rx operations in a wavelength division parallel visible light communication system according to an embodiment of the present invention. Referring to FIG. 4, when the Tx/Rx operations start, in step 510, the transmitter 401 starts to transmit data to the receiver 402. In step 520, the transmitter 401 simultaneously transmits an original signal provided through the first path and the other signal through the second path, which has been inverted and then delayed by one time slot. In step 530, the receiver 402 receives the original signal and the inverted and delayed signal, and in step 540, separates the received signal into the original signal and the inverted and delayed signal. The inverted and delayed signal goes through the inverse delay unit 424 and the inverter 422 in order to be advanced and to be inversed. In step 550, the original signal, and the signal advanced and inversed by the receiver 402 are combined by the gain adjuster 420 in terms of the diversity combination. In step 560, the received signal is restored back to its former state. Thereafter, in step 570, it is determined whether the Tx/Rx operations are completed. If it is determined in step 570 that the Tx/Rx operations are completed, the procedure moves to step 580 to complete the Tx/Rx operations of the visible light communications. If it is determined in step 570 that the Tx/Rx operations are not completed, the procedure returns to step 510 to repeat the Tx/Rx operations until the Tx/Rx operations are completed. Also, an iterative encoding technique may be applied to an embodiment of the present invention, in step 550, the signals that has been repeatedly transmitted through the two paths are combined into a single signal.

Figure 5:
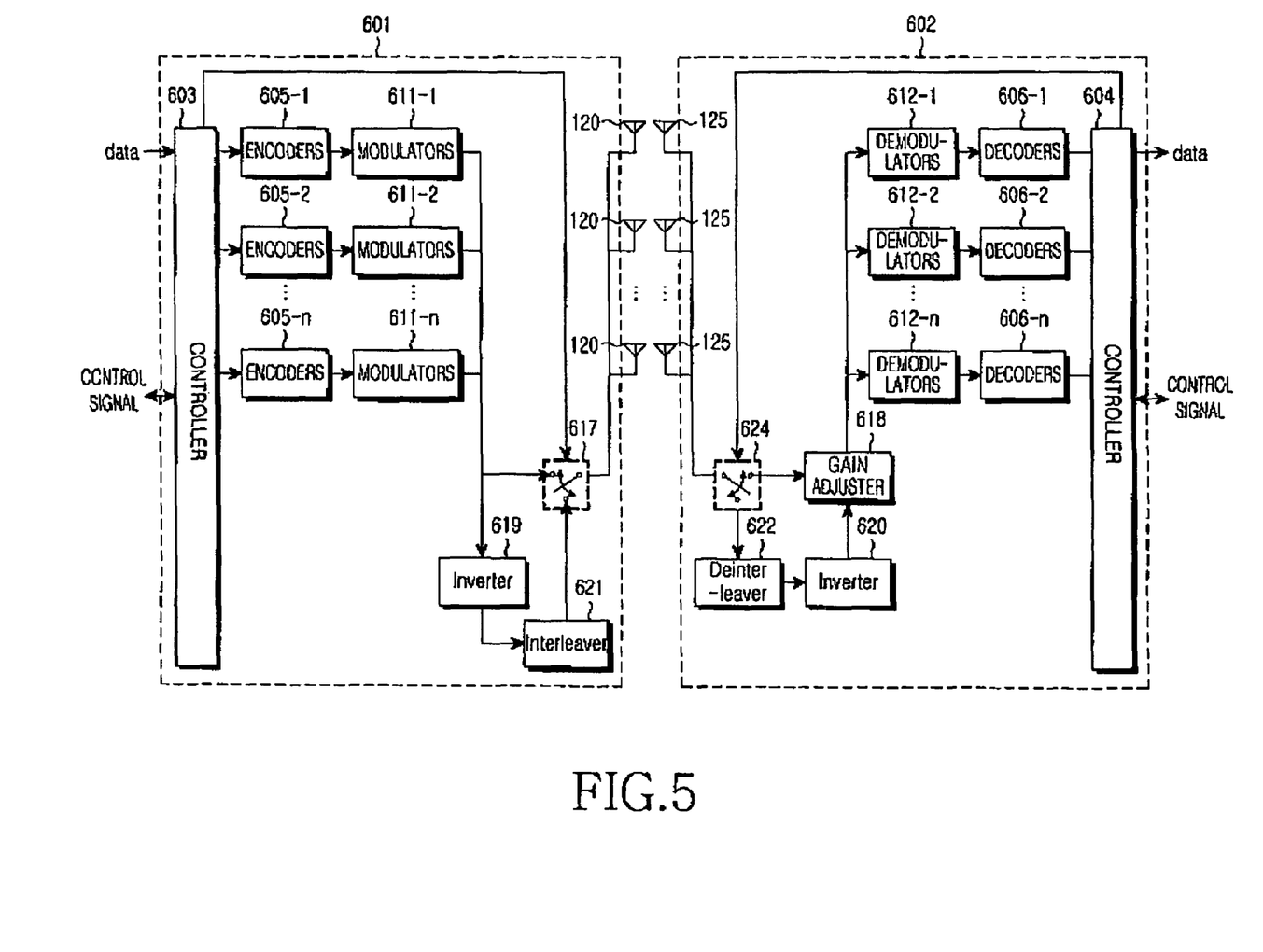
FIG. 5 is a block configuration diagram illustrating a transceiver for wavelength division parallel visible light communications according to another embodiment of the present invention.

FIG. 5 is a block configuration diagram illustrating a transceiver for wavelength division parallel visible light communications according to another embodiment of the present invention. With reference to FIG. 5, a transmitter 601 for wavelength division parallel visible light communications includes multiple encoders 605, multiple modulators 611, an inverter 619, an interleaver 621, a switch 617, a light generator 120 and a controller 603. The multiple encoders 605 have a parallel configuration, and perform channel coding on data to be transmitted. The multiple modulators 611 modulate respective channel-coded data from the multiple encoders 605. The inverter 619 inverts the signal (i.e., a '1' of a signal provided by the multiple modulators 611 into '0,' and a '0' into '1'). The interleaver 621 changes the order of an inverted signal from the inverter 619 in a preset pattern that the receiver 602 can determine. According to a switching control signal, the switch 617 connects to a light generator, an original signal provided through a first path via the multiple modulators 611 or an inverted and interleaved signal provided through a second path. The light generator is made up of LEDs, and transmits a visible light signal. The controller 603 controls configuration elements of the transmitter 601 during a transmission operation, and outputs the original signal and inverted interleaved signal.

A receiver 602 for wavelength division parallel visible light communications includes a light sensor 125, a switch 624, a deinterleaver 622, an inverter 629, a gain adjuster 618, multiple demodulators 612, multiple decoders 606, and a controller 604. The light sensor receives a visible light signal. The switch 624 connects the original signal to the gain adjuster 618 if the visible light signal received by the light sensor corresponds to the original signal and connects the inverted and interleaved signal to the deinterleaver 622 if the received visible light signal corresponds to the inverted and interleaved signal. The deinterleaver 622 receives the inverted and interleaved signal from the switch 624, which order is in a pattern preset by the interleaver 621, and restores the inverted and interleaved signal back to its original order. The inverter 620 receives an inverted signal from the deinterleaver 622, and restores the inverted signal back to its state prior to the inversion by inverting the inverted signal. The gain adjuster 618 inputs the original signal provided from the switch 624 and the restored signal going through the interleaver 622 and the inverter 620, and adds gain of the original signal and gain of the restored signal by adjusting the gains of the two signals. The multiple demodulators 612 have a parallel configuration and each demodulates a signal added by the gain adjuster 618. The multiple decoders 606, having a parallel configuration, receive respective data demodulated by the multiple demodulators 612, and perform channel decoding on the respective received data thereof. The controller 604 controls configuration elements of the receiver 602 during a receive operation, and outputs the switching control signal by dividing the received signal into the original signal and the inverted and interleaved signal.

A description will be described of a method for correcting a color tone of visible light according to another embodiment of the present invention In this embodiment, transmitter 601 transmits data to be transmitted in parallel by each path. The data to be transmitted is transmitted to the receiver 602 through the first path or through the second path. A forward flow of the first path starts from the multiple encoders 605, passes through the multiple modulators 611 and the switch 617, and ends with a light generator. A forward flow of the second path starts from the multiple encoders 605, passes through the multiple modulators 611, the inverter 619, the interleaver 621 and the switch 617, and ends with the light generator (not shown). Finally, the form of a signal transmitted from the transmitter 601 is associated with a scheme where one signal passing through the first path and another signal passing through the second path are transmitted in turn. Because of the form where the original signal and a signal which order has been changed following an inversion of the original signal are transmitted in turn, a signal transmitted during an interleaving period consists of pairs of the original signal and its inverted signal, and the mean of electric power by respective wavelengths of the signal transmitted during the interleaving period corresponds to half of the total electric power that can be transferred. Therefore, whatever form the original signal transmitted through the first path has, because the other signal transmitted through the second path compensates the original signal, electric power among the wavelengths substantially equals to one another. Upon receiving the visible light signal, the receiver 602 enables the switch 624 to divide a received signal into one signal transmitted through the first path and the other signal transmitted through the second path according to a switching control signal. The receiver 602 enables the deinterleaver 622 and the inverter 620 to receive the other signal transmitted through the second path and to restore the received signal back to its state prior to the inversion and interleaving. Then, the receiver 602 enables the gain adjuster 618 to adjust gain of the original signal transmitted through the first path and gain of the restored signal and to add the gains of the two signals. Thereafter, the signals from the gain adjuster 618 pass through the multiple demodulators 612 and the multiple decoders 606, and are then all restored. In the visible light communication system according to another embodiment of the present invention, the transmitter 601 can radiate white light whose color balance is kept according to a method for correcting a color tone of visible light using the diversity, and the receiver 602 can acquire diversity gain generated from time diversity having enough time intervals.

Also, an iterative encoding technique can be applied to another embodiment of the present invention. In a case where the same signal is repeatedly transmitted from the transmitter 601 by using an iterative encoding technique, Tx/Rx operations are accomplished through the above-described operation, and in this case, the gain adjuster 618 repeatedly adds the transmitted signals into a single signal.

Figure 6:
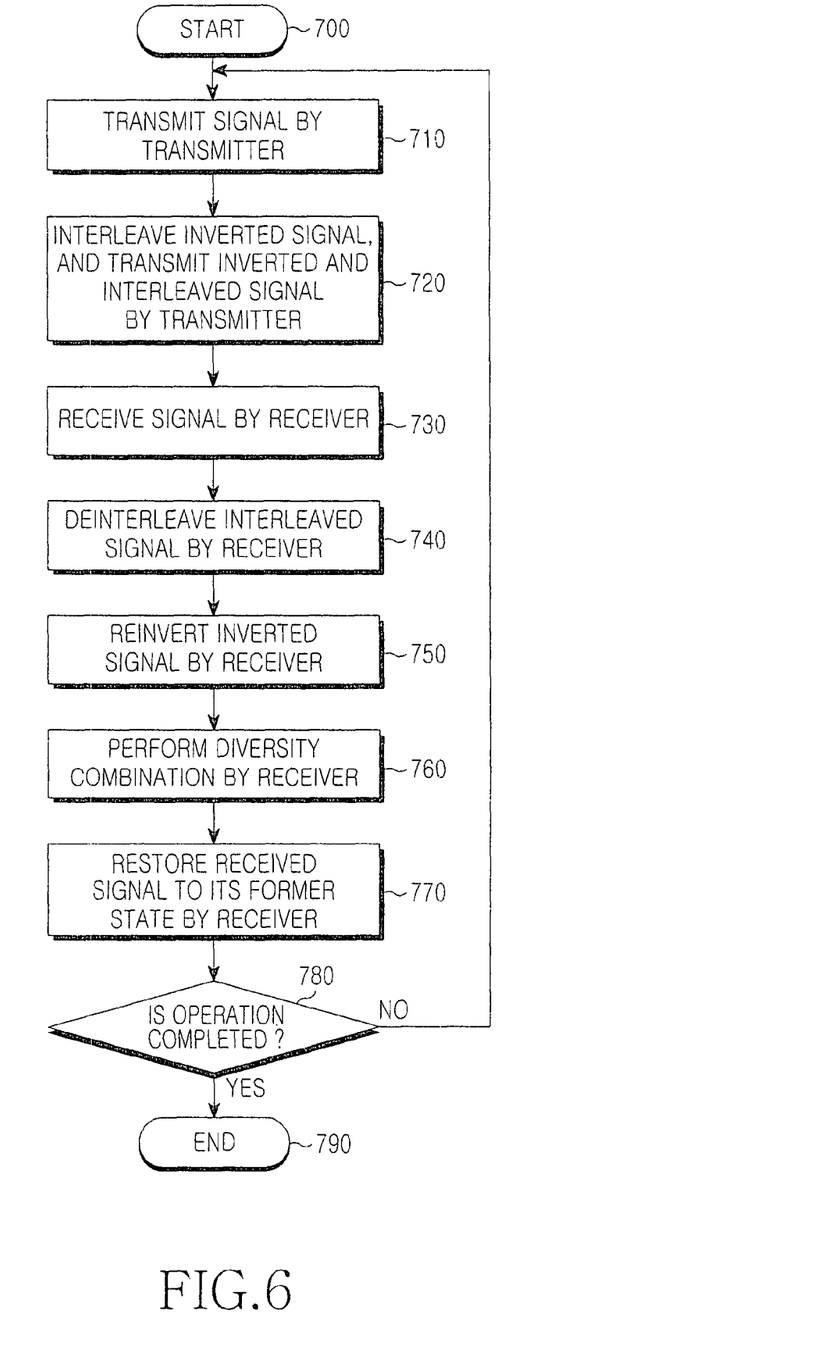
FIG. 6 is a flowchart illustrating Tx/Rx operations in wavelength division parallel visible light communications according to another embodiment of the present invention.

FIG. 6 is a flowchart illustrating Tx/Rx operations in wavelength division parallel visible light communication system according to another embodiment of the present invention. Referring to FIG. 6, when the Tx/Rx operations start, in step 710, the transmitter 601 starts to transmit data to the receiver 602. In step 720, the transmitter 601 simultaneously transmits an original signal provided through a first path and a second signal through a second path. The second signal has been inverted and the order 1 has been changed in a preset pattern. In step 730, the receiver 602 receives the original signal and the inverted and interleaved signal, and in step 740, separates the received signal into the original signal and the inverted and interleaved signal. The inverted and interleaved signal passes through the deinterleaver 622 in order to be restored back to its former order. In step 750, the signal that has been deinterleaved by the deinterleaver 622 passes through the inverter 620 in order to be restored to its state prior to the inversion. In step 760, the original signal, and the signal deinterleaved and reinverted by the receiver 602 are combined by the gain adjuster 618 in term of the diversity combination. In step 770, the received signal is restored back to its former state. Thereafter, in step 780, it is determined whether the Tx/Rx operations are completed. If it is determined in step 780 that the Tx/Rx operations are completed, the procedure moves to step 790 to complete the Tx/Rx operations of the visible light communications. If it is determined in step 780 that the Tx/Rx operations are not completed, the procedure returns back to step 710 to repeat the Tx/Rx operations until the Tx/Rx operations are completed. Also, an iterative encoding technique may be applied this embodiment of the present invention, in step 760, the signals that have been repeatedly transmitted through the two paths are combined into a single signal.

The merits and effects of exemplary embodiments, as disclosed in the present invention, and as so configured to operate above, will be described as follows.

As the present invention is applied to wavelength division parallel visible light communication system, diversity gain through time diversity can be obtained while parallel transmission using wavelength division is performed. Furthermore, white light suitable for lighting which color balance by respective wavelengths is kept can be acquired.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by the embodiments described herein but by the appended claims and equivalents of the appended claims.

What is claimed is:

1. A method for correcting a color imbalance of visible light in wavelength division parallel visible light communication system, the method comprising:

inverting an original signal, including information, by a visible light communication transmitter;

transmitting the original signal, including the information, and the inverted signal;

receiving the original signal including the information and the inverted signal;

restoring the inverted signal back to its state prior to the inversion by reinverting the inverted signal; and performing a diversity combination on the original signal, including information, and the restored signal.

2. The method as claimed in claim 1, wherein the inverted signal is delayed by a preset time slot.

3. The method as claimed in claim 2, further comprising:

advancing by a preset time slot the original signal to restore the time relationship between the original signal and the inverted signal.

4. The method as claimed in claim 1, wherein the inverted signal is interleaved, and the order of the inverted signal is changed in a preset pattern when the original signal including information is inverted.

5. The method as claimed in claim 4, further comprising:

deinterleaving the received signal into the original signal and the inverted signal.

6. The method as claimed in claim 1, wherein the signals having a preset prescribed time interval are repeatedly transmitted as much as a preset number of times are combined into a single signal by the visible light communication receiver.

7. The method as claimed in claim 6, further comprising:

combings the repeatedly transmitted signal into a single signal.

8. An apparatus for correcting a color imbalance of visible light in wavelength division parallel visible light communication system, the apparatus comprising:

a visible light communication transmitter comprising:

multiple encoders having a parallel configuration for performing channel coding on data to be transmitted;

multiple modulators having a parallel configuration for modulating data on which the multiple encoders have performed the channel coding;

an inverter for inverting a signal provided by each of the multiple modulators;

a switch for connecting in turn an original signal provided by the multiple modulators and an inverted signal from the inverter with a light generator according to a switching control signal;

a light generator for transmitting a visible light signal; and a controller for controlling configuration elements of the visible light communication transmitter during a transmission operation, and for outputting the switching control signal, and a visible light communication receiver, comprising:

a light sensor for receiving the visible light signal;

a switch for connecting the original signal to a first path if the visible light signal received by the light sensor corresponds to the original signal and connecting the inverted signal to a second path if the received visible light signal corresponds to the inverted signal, according to a switching control signal;

an inverter for restoring the received inverted signal back to its state prior to the inversion by reinverting the received inverted signal;

a gain adjuster for inputting the original signal going through the first path connected by the switch and the restored signal going through the second path, for adding gain of the original signal and gain of the restored signal by adjusting the gains of the two signals;

multiple demodulators having a parallel configuration for demodulating the signals added by the gain adjuster;

multiple decoders having a parallel configuration for receiving respective data demodulated by the multiple demodulators, and for performing channel decoding on the respective received data thereof; and a controller for controlling configuration elements of the visible light communication receiver during a receive operation, and for outputting the switching control signal by determining if the received signal corresponds to the original signal or the inverted signal.

9. The apparatus as claimed in claim 8, wherein the visible light communication transmitter further comprises:

a delay unit for delaying the inverted signal by a preset time slot on a transmission path of the inverted signal between the inverter and the switch.

10. The apparatus as claimed in claim 9, wherein the receiver further comprising:

an inverse delay for restoring the delayed signal back to its time state with respect to the original signal.

11. The apparatus as claimed in claim 8, wherein the visible light communication transmitter further comprises:

an interleaver between the inverter and the switch for changing the order of the inverted signal in a preset pattern.

12. The apparatus as claimed in claim 11, wherein the receiver further comprising:

a deinterleaver for restoring the interleaved signal back to its former order.

13. The apparatus as claimed in claim 8, wherein the visible light communication transmitter repeatedly transmits the same signals a preset number of times.

14. The apparatus as claimed in claim 13, wherein the receiver further combining into a single signal, signals that have been repeatedly transmitted.

15. A visible light communication transmitter, comprising:

multiple encoders having a parallel configuration for performing channel coding on data to be transmitted;

multiple modulators having a parallel configuration for modulating data on which the multiple encoders have performed channel coding;

an inverter for inverting a signal provided by each of the multiple modulators;

a delay unit for delaying the inverted signal by a preset time slot; and a controller for controlling configuration elements of said visible light communication transmitter during a transmission operation wherein one of outputs of the multiple modulators and the delay unit are provided to a light generator for subsequent transmission.

16. A visible light communication receiver, comprising:

a light sensor for receiving a visible light signal, said signal including an interleaved first and second signals;

a switch for connecting first signal to a first path and connecting a second signal to a second path according to a switching control signal;

an inverter for inverting the received second signal;

a gain adjuster for inputting the first signal passing through the first path and the inverted second signal passing through the second path, for adding gain of the first signal and gain of the second signal by adjusting the gains of the two signals;

multiple demodulators having a parallel configuration for demodulating the signals added by the gain adjuster;

multiple decoders having a parallel configuration for receiving respective data demodulated by the multiple demodulators, and for performing channel decoding on the respective received data thereof; and a controller for controlling configuration elements of the receiver, and for outputting the switching control signal by determining if the received signal corresponds to the first signal or the second signal.

17. The receiver as claimed in claim 16, wherein further comprising:

an inverse delay for restoring the second signal back to its time state with relation to the first signal.

18. The receiver as claimed in claim 17, wherein further comprising:

a deinterleaver for deinterleaving said received signal.

19. The receiver as claimed in claim 16, wherein further comprising:

a delay unit for restoring the time relationship between the first and second signals.

* * * * *